(12) United States Patent
Goeckner et al.

(10) Patent No.: US 8,695,482 B2
(45) Date of Patent: Apr. 15, 2014

(54) BREWER HAVING A PROGRAMMABLE TEMPERATURE COMPONENT

(75) Inventors: Victor D. Goeckner, Auburn, IL (US); Jamie Dee Schroetlin, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1616 days.

(21) Appl. No.: 11/718,624

(22) PCT Filed: Nov. 16, 2005

(86) PCT No.: PCT/US2005/041609
§ 371 (c)(1),
(2), (4) Date: Jul. 23, 2007

(87) PCT Pub. No.: WO2006/055673
PCT Pub. Date: May 26, 2006

(65) Prior Publication Data
US 2008/0000358 A1    Jan. 3, 2008

Related U.S. Application Data

(60) Provisional application No. 60/628,783, filed on Nov. 17, 2004.

(51) Int. Cl.
*A47J 31/047* (2006.01)

(52) U.S. Cl.
USPC ............... 99/281; 99/275; 99/279; 99/280; 99/326; 99/331; 99/333; 99/285; 99/300; 426/433

(58) Field of Classification Search
CPC ......... A47J 31/002; A47J 31/44; A47J 31/56; A47J 31/057
USPC ........... 99/275, 279, 280, 281, 326, 331, 333, 99/285, 300; 426/231, 433
See application file for complete search history.

(56) References Cited

U.S. PATENT DOCUMENTS

| | | | | | |
|---|---|---|---|---|---|
| 3,537,384 | A | * | 11/1970 | Stauber | 99/302 R |
| 5,094,153 | A | * | 3/1992 | Helbling | 99/280 |
| 5,738,001 | A | * | 4/1998 | Liverani | 99/283 |
| 6,095,031 | A | | 8/2000 | Warne | |
| 6,155,158 | A | | 12/2000 | Anson | |
| 6,164,189 | A | | 12/2000 | Anson | |
| 6,479,086 | B1 | * | 11/2002 | Knepler | 426/231 |
| 2003/0126993 | A1 | * | 7/2003 | Lassota et al. | 99/279 |
| 2003/0155101 | A1 | * | 8/2003 | Minney | 165/58 |
| 2005/0150391 | A1 | * | 7/2005 | Schifferle | 99/295 |

* cited by examiner

*Primary Examiner* — Dana Ross
*Assistant Examiner* — Brett Spurlock
(74) *Attorney, Agent, or Firm* — Barnes & Thornburg LLP

(57) ABSTRACT

A beverage making apparatus having structures and methods to facilitate programming of the apparatus with parameters suitable for a pre-determined brewing substances. The beverage making apparatus has a water delivery system for delivering water to a brewing substance holder containing a brewing substance. A temperature adjusting system is provided for adjusting the temperature of water in the water delivery system. A controller is provided for controllably operating the apparatus, the controller further being programmable with characteristics suitable for predetermined brewing substances.

15 Claims, 1 Drawing Sheet

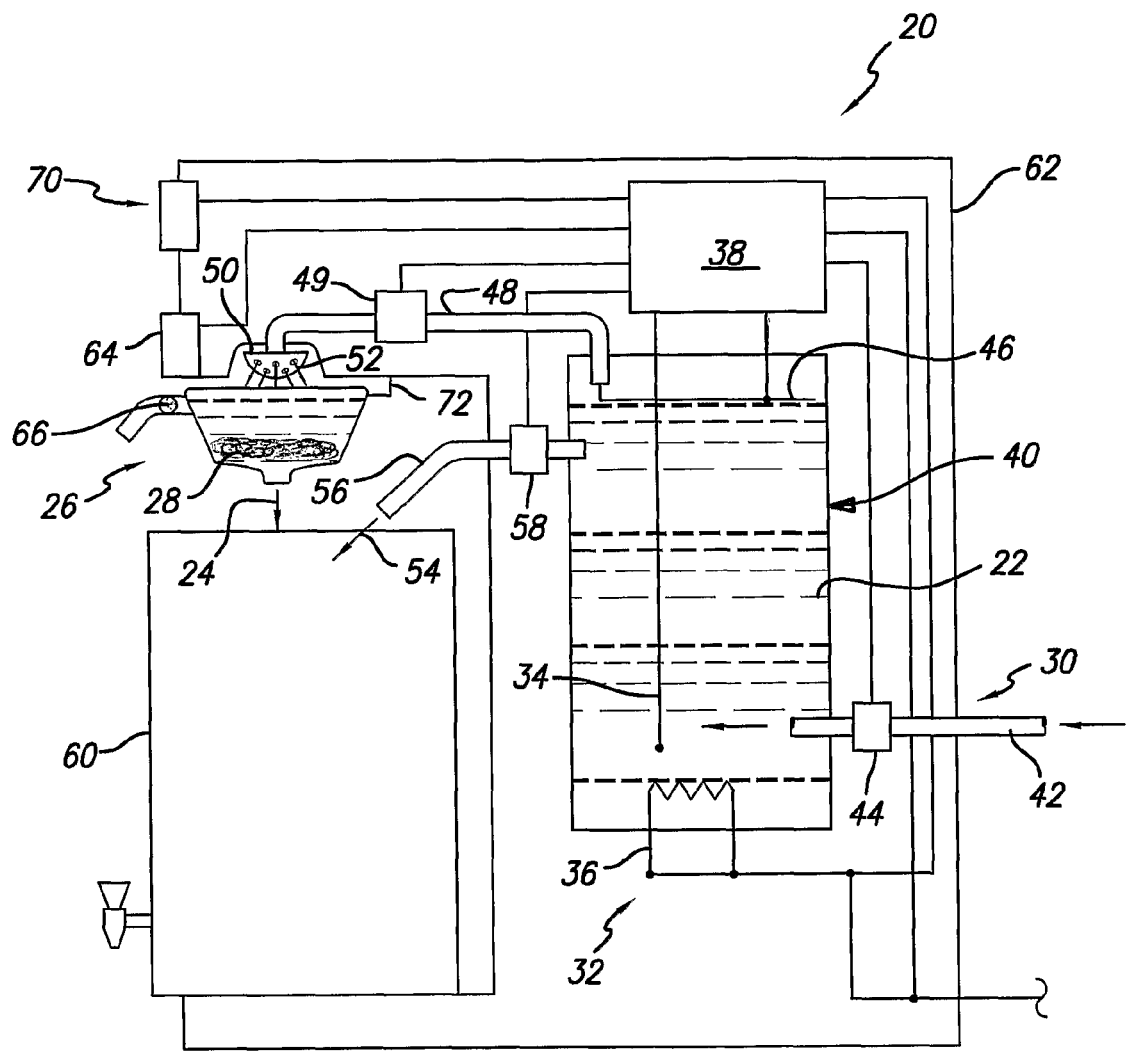

BREWER HAVING A PROGRAMMABLE TEMPERATURE COMPONENT

CROSS-REFERENCE TO RELATED PATENT APPLICATION

This patent application is a U.S. Nationalization of international patent application no. PCT/US2005/041609, filed Nov. 16, 2005, which claims the benefit of U.S. Provisional Patent Application No. 60/628,783, filed Nov. 17, 2004. The disclosure set forth in the referenced provisional application is incorporated herein by reference in its entirety, including all information as originally submitted to the United States Patent and Trademark Office.

BACKGROUND

The present disclosure relates to brewing devices and more particularly, brewing devices which include programmable features to facilitate controlled brewing of a beverage brewing substance.

A variety of beverage brewing devices have been developed which facilitate the controlled production of beverages. Such beverage brewing devices might be in the form of a coffee brewer, tea brewer or brewer of any other type of beverage brewing substance. Such beverage brewing devices typically retain a volume or quantity of beverage brewing substance such as ground coffee, tea or other substances in a container for dilution or infusion with heated water. The heated water is introduced into the container whereby it mixes with the brewing substance to produce a desired brewed beverage. The temperature of the water dispensed over the brewing substance is typically within a preset range, for example, 190° F.-205° F. The water is heated in and retained in a heated water reservoir. The temperature of the water is set at the reservoir by means of a thermostatic control circuit.

A variety of brewing devices have been developed which control various characteristics of the brewing process. This includes the quantity of water dispensed over the brewing substance, the dispensing of bypass water which is not directly introduced into the brewing substance, the quantity of water dispensed over a period of time, as well as time delayed brewing. All these features may provide potential benefits to the flavor profile of the resulting brewed beverage.

Additional features and embodiments will become apparent to those skilled in the art upon consideration of the following detailed description of drawings.

BRIEF DESCRIPTION OF THE DRAWINGS

The present disclosure will be described hereafter with reference to the attached drawing which is provided as a non-limiting example only, in which:

FIG. 1 is a general diagrammatic illustration of a brewing system employing the teachings and techniques set forth herein.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawing.

While the term "heated" may be used throughout this disclosure, the term is to be broadly interpreted to include all forms of water or dilution liquid of any temperature, generally in which the water has been heated. The term heated includes the term "hot" such that one might consider the water to be hot based on the numerical temperature. Generally, the temperature of the water is below or at the relevant boiling temperature (212 degrees F. at sea level) above which the water will generally transform to steam. The term heated is used to distinguish from the term unheated such that unheated water is generally introduced into the reservoir during the brewing cycle. In or near the reservoir the water is heated resulting in heated water.

The present disclosure may be used in connection with a variety of beverage making machines. Terms including beverage, brewed, brewing, and brewed beverage as may be used herein are intended to be broadly defined as including, but not limited to the brewing or making of tea, coffee and any other beverages or food substances that will benefit from the present disclosure. This broad interpretation is also intended to include, but not be limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal or other form of beverage or food materials to obtain a desired beverage or food product. This broad interpretation is intended to include, without limitation, at least funnel and filter-type, packet or pouch-type, pod-type or other prepackaged or unpackaged forms of retaining and brewing a beverage or making of a food product. The terms heated water may be interpreted as hot water, and generally refers to adding energy to water to heat the water above ambient temperature.

While the disclosure shows an illustration of a brewer as described, it is intended and understood that the term brewer is to be broadly interpreted to include brewers of any configuration including that as shown as well as, by way of example but not limitation, drip, filtered, single cup or pod brewers. Pod brewers are brewers which retain a pod or prepackaged beverage product and deliver to or force water through the pod to brew a beverage. Many pod brewers produce one or two cups of beverage instead of 4-12 cups as is produced by many other brewers. Pod brewers may be configured consistent with the teachings of this disclosure to be connected to a pressurized water line and provide line pressure brewing. The teachings of this disclosure are intended to be broadly interpreted and applied to a variety of brewer sizes, styles and configurations consistent with the principals disclosed herein.

A brewer 20 includes the structures and methods to facilitate programming the brewer to incorporate temperature as a characteristic of a brewing recipe. The temperature referred to in the present application as being controllable and as a component of the recipe is the temperature of water 22 which is used to brew. As will be referred to throughout this application, this water 22 will be generally referred to as "brew water". A variety of characteristics can be incorporated in the brewing recipe including the quantity of water to be dispensed, the flow pattern of dispensing water, the quantity or percentage of bypass water, or any other characteristic. The present system, method and apparatus incorporates temperature as a recipe component.

Temperature as a recipe component may be valuable in a variety of situations, some of which will be evident based on the disclosure and others which will be discovered as a result of this disclosure. One example in which temperature might be used as a recipe component would be in the use of brewing tea as well as coffee using the same beverage brewing device. In other words, the same brewing device can be configured for brewing tea and can also, separately brew coffee. In one brewing cycle the device can combine ground coffee and water to produce coffee and during a separate brewing cycle the device can be used to brew tea. In this example, it may be desirable to brew teas at a temperature of 200° F. However, some teas, for example green tea, may be more desirable when brewed at a lower temperature, for example, 190° F. Additionally, by using the present apparatus and methods, it may be discovered that other substances, such as different types of coffee, different grinds or roasts of coffee, different herbs and different combinations of brewing substances may produce a more desirable or different taste profile or flavor characteristics when brewed at different temperatures. The different temperatures may have an effect on the essential oils and other flavoring components in the brewing substance such that the ability to change the temperature of the brew water over a range of, for example, ±20° F. may have an effect on the resulting beverage.

The method of the following disclosure includes providing a brewing apparatus 20 shown diagrammatically in FIG. 1 for use in brewing a beverage 24. The brewing apparatus 20 includes a container, holder or funnel 26 for retaining and brewing substance 28. The brewing substance 28 is shown diagrammatically as being retained in the container or holder 26. It will be appreciated from the present disclosure and knowledge of the prior art that the holder may also include some form of filter structure for retaining the brewing substance 28 within the funnel. The filter structure may include, by way of example, but not limitation, a reusable filter, a paper filter, a fabric filter or any other type of filter structures either reusable or disposable, as well as being sealed or open. Additionally, the holder includes any other type of brewing structure such as a self contained brewing assembly which includes the filtering structure, brewing substance and a container to hold the filtering structure and brewing substance.

A water delivery system 30 is incorporated in the brewing apparatus 20 to heat and deliver water to the holder 26. Details of the water delivery system 30 will be described in greater detail below. The water delivery system 30 also includes a water temperature adjusting system 32. The water temperature adjusting system 32 includes at least one temperature sensor 34, a heater 36 and a controller 38 for controlling the temperature of the water in the water delivery system. The heater 36 as diagrammatically shown in FIG. 1 may be any one or a combination of heaters. The present disclosure is intended to broadly cover any form of heater positioned inside, outside or otherwise providing heat energy to the water in the reservoir. The controller 38 controls the temperature of water 22 in a reservoir 40 of the water delivery system 30 so that a quantity of water can be maintained and controlled to provide brewing water at a predetermined temperature, temperatures or within a predetermined temperature range. The sensor 34 could be positioned inside or outside of the reservoir.

In the method of the present system, the user programs a brewing temperature for use with a predetermined brewing substance. The combination of the information about the brewing substance and the brew water temperature is retained in, programmed into, read by, or otherwise provided to the controller 38. When the user initiates a brewing cycle by instructing the controller 38 to operate, the controller 38 detects the temperature of the water in the reservoir 40 and then adjusts the temperature of the water, if necessary, prior to brewing. If the water temperature is at the selected temperature or within a selected temperature range, the brewing cycle is initiated.

If the water temperature in the reservoir 40 is not at the selected temperature or within temperature range, the system will adjust the temperature, either increasing the temperature or decreasing the temperature of the water to be dispensed into the holder 26 to accommodate the programmed or otherwise introduced temperature characteristics. In the situation where the temperature needs to be increased, the water delivery system 30 initiates a heating cycle to raise the temperature to the predetermined temperature or range prior to brewing. If the temperature needs to be decreased, the system will refrain from turning on a heating component of the water delivery system and instead introduce unheated or cooled water. The dilution water 54 is dispensed into a server 60 positioned therebelow for mixing with the brewed beverage 24. Additionally, optional substances such as flavorings, sweeteners, base components such as milk base products or other ingredients can also be added to the server at this time. Additionally, the dispensing of the dilution water can be initiated simultaneous with the dispensing of the brewed beverage 24 or can be delayed for a period of time depending on the desired effect. For example, some recipes may call for delaying the dilution of the brewed beverage in the server 60 for a period of time. This allows the brewed beverage to cure or otherwise stabilize before dilution the dilution water 54. Some recipes may call for such a delay time and the recipe may be used to program this into the controller 38. The recipe calling for such delay may do so for reasons of flavor characteristics, esthetic presentation or other reasons. It is believed that in some tea beverages, the delaying of the dilution may prevent the tea from becoming cloudy, reduce the level of cloudiness or maintain a desired level of clarity or transparency.

With further reference to FIG. 1, the brewer 20 is shown as being used for brewing tea. It should be noted, however, that the device can be used to brew coffee as well as any other type of beverage. The brewer includes the reservoir 40 for retaining a quantity of water 22 in a heated condition. Water is introduced through the inlet line 42 by use of a controllable valve 44 coupled to the controller 38. Water is introduced through the inlet line 42 to the reservoir 40 for heating by the heater 36. The temperature sensor 34 detects the temperature of the water to indicate to the controller whether heating is required. A level sensor 46 is provided in the upper portion of the reservoir 40 for detecting a level of water in the reservoir 40. Any of a variety of level sensors or combinations of level sensors could be used with this brewer including conductive, pressure, optical, sonic and any other type of level sensor positioned inside, outside or in proximity to the reservoir. The level sensor as shown in FIG. 1 is provided for illustrative purposes only and is not intended to limit the scope to that as shown.

A dispense line 48 communicates with the reservoir 40 for delivering water from the reservoir to a spray head 50. A controllable valve 49 communicates with the dispensing line 48. The controllable valve 49 is coupled to the controller 38 for controllable operation during a brewing cycle. Water 52 dispensed from the spray head flows into the holder 26 for infusion with the brewing substance 28 to produce the brewed beverage 24. Dilution water 54 is dispensed through a dilution water line 56 also coupled to the reservoir 40 and controlled by a controllable valve 58 coupled to the controller 38. The brewed beverage 24 and dilution water 54 are dispensed into a server or container 60 positioned below the holder 26. While a pressurized water line is shown as providing water to the reservoir the water delivery system may be a gravity feed system such as is well known in the art. In such a gravity feed system water is positioned in a basin which communicates with the reservoir for delivering water to the reservoir. The water delivery system may also be a combination of a pressurized line and a gravity feed system. In general, the water delivery system is intended to be broadly interpreted in this disclosure and not limiting.

A housing or frame 62 is provided to contain all the components of the brewer 20.

A device reader 64 is provided on the brewer 20 for detecting and reading an information device 66 carried on the funnel. The information device may be any form of device which can store and provide information, including but not limited to RFID devices, magnetic strips and others now existing or hereafter developed. The present disclosure incorporates by reference in entirety U.S. Pat. Nos. 6,465,035, 6,479,086 and 6,238,721 issued to the assignee of the present application. Additionally, the present application incorporates by reference in its entirety, U.S. patent application Ser. No. 10/271,619, filed Oct. 14, 2002 and assigned to the applicant of the present invention.

Additionally, the present application incorporates the subject matter of PCT Application Serial No. PCT/US04/34659, filed Oct. 20, 2004, claiming priority from U.S. Provisional Application Nos. 60/512,684 filed Oct. 20, 2003 and 60/523,177 filed Nov. 18, 2003, and assigned to the assignee of the present application. This application addresses issues related to optimizing the control of the heater 36, temperature probe 34 and the relationship of these devices and other structures within the brewer 20. A control panel 70 of generally known construction is coupled to the controller 38 and may display information as well as introducing information to the controller.

In use, the brewer 20 of the present invention incorporates temperature as a brewing recipe component by providing devices to allow the user to program, either actively or passively, information about the brewing substance, and other characteristics to invoke, program, or otherwise use an appropriate temperature in conjunction with the brewing substance 28. A brewing cycle is initiated when a user introduces a holder 26 containing a quantity of brewing substance 28 to a retaining structure 72 of known construction such as rails which are found on many brewing devices. The rails 72 retain the holder 26 in a position underneath the spray head 50 for receiving water therein. If the funnel includes an information device 66 and the brewer includes a reader 64, the reader can be used to provide information to the controller 38 from the information device 66. If the brewer 20 does not include the reader 64, the user can use the input and output device 70 to introduce temperature information for use during the brewing cycle.

Once the controller 38 identifies a desired temperature or temperature range for brewing, it will detect the current temperature using the temperature probe 34. If the temperature of the water 22 in the reservoir is below the desired temperature or temperature range, the heater 32 is activated to provide energy to the water 22 and elevate the temperature. Periodic detecting by the temperature probe 34 will result in providing information to the controller 38. When the desired temperature or temperature range is detected, the controller 38 will allow water to flow from the reservoir 40 to the holder 26. As an additional matter, the dispensing of water from the reservoir 40 to the holder 26 may occur automatically once the desired temperature is achieved or, alternatively, may result in a signal. The signal would indicate to the user that the desired temperature range is sufficient and that the brewing process may continue. Once the user observes the signal, the user can then select a choice such as activation of a switch or other touch panel controls to instruct the brewer to proceed with the brewing process. The brewer then can control the inlet valve 44. Without further activation, the inlet valve 44 will not be controlled and the water will not flow. Water will be allowed to flow by operation of the inlet valve 44 to introduce water through the inlet line 42 and into the reservoir 40. As water is introduced into the reservoir 40 through the inlet line 42, the level of the water will rise. As the water level rises, it will be forced through the dispensing line 48. At a predetermined time, the controller 38 will operate the dispense valve 49 to allow water to flow through the dispense line 48 to the spray head 50 and into the holder 26.

As an additional matter, the present application incorporates in its entirety the subject matter of PCT Application Ser. No. PCT/US05/40434, filed Nov. 8, 2005, entitled "System and Method for Preventing Tank Overheating" claiming priority from U.S. Provisional Application No. 60/626,650 filed Nov. 10, 2004, and assigned to the assignee of the present application. This application refers to a system which does not include a dispense valve 49 and instead generally controls the dispensing of water by use of the inlet line 42 pressure and control valve 44. If additional dilution water 54 is required the controller 38 will controllably dispense water through the dilution line 56 by operation of the controllable valve 58. At an appropriate time, the inlet valve 44 and outlet or dispense valve 49 will be closed, thereby ceasing the dispensing of water in the brew cycle.

If the temperature of the water in the reservoir 40 is above the temperature or above the upper level of the temperature range, the system can respond in one of several ways. The system can introduce water through the inlet line 42 and not activate the heater 32. This will result in drawing down the temperature of the water 22 in the reservoir 40 as a result of not adding heat energy. While this may result in some of the water in the upper level of the reservoir 40 being at a slightly higher temperature, a subsequent brew cycle will likely have water at the desired temperature or within the desired temperature range.

Additionally, the system can delay brewing until the temperature of the water in the reservoir 40 has dropped to a desired level. This period of time may be significantly less if the brewing cycle is one of several brew cycles. In other words, the first brew cycle might use water at a slightly elevated temperature relative to the desired temperature or temperature range. However, subsequent brew cycles might not require the addition of energy from the heater or only the amount of energy from the heater. In this regard, the controller 38 can include programming which will take into account the current temperature of the water. Also, the controller 38 can be programmed to obtain a series of temperature readings to help determine a trend in the brew water temperature. This will help the system to anticipate temperature changes.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There is a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A beverage making apparatus comprising:
    a controllable water delivery system to heat and deliver brew water to a brewing substance holder which is removably attachable to the beverage making apparatus;
    a controllable temperature adjusting system for adjusting the temperature of the brew water in the water delivery system;
    a controller for controllably operating the apparatus, the controller being coupled to the water delivery system and the temperature adjusting system and being programmable with characteristics suitable for predetermined brewing substances;
    the temperature adjusting system including at least one temperature sensor and a heater, the temperature sensor and the heater coupled to and in communication with the controller for controlling the temperature of water in the water delivery system; and
    a device reader coupled to and in communication with the controller and associated with the apparatus for detecting and reading an information device on the brewing substance holder, the information device including brewing temperature information for use in setting the brew water temperature of the water delivery system.

2. The apparatus of claim 1, wherein the water delivery system further comprises an inlet line comprising a controllable valve for delivering water to a reservoir for receiving water, the reservoir and the controllable valve being connected to and in communication with the controller to control the delivery of water to the reservoir.

3. The apparatus of claim 2, further comprising a level sensor for detecting at least one of a level or range of levels of water in the reservoir, the level sensor being in level sensing communication with the reservoir.

4. The apparatus of claim 2, further comprising a dispense line for delivering water from the reservoir to a spray head, the dispense line further comprising a controllable valve coupled to and in communication with the controller, wherein water from the spray head flows into the holder containing brewing substance.

5. The apparatus of claim 1, wherein the controller increases heat delivered by the heater to further increase temperature of water in the reservoir when the temperature of the water is below the programmed range suitable for predetermined brewing substances.

6. The apparatus of claim 1, wherein the controller refrains from energizing the heater when water in the water delivery system requires the temperature to be decreased based on parameters provided to the controller.

7. The apparatus of claim 1, wherein the controller introduces unheated water to the water delivery system when water in the water delivery system requires the temperature to be decreased based on parameters provided to the controller.

8. The apparatus of claim 7, further comprising a dilution line for delivering dilution water to a server for receiving dilution water and mixing brewed beverages with dilution water, the server suitably positioned to receive water from the dilution line and the holder, the dilution line further comprising a controllable valve coupled to and in communication with the controller for controllably delivering dilution water through the dilution line.

9. The apparatus of claim 8, wherein the dilution line may deliver one or more items to the server, items being selected from the group consisting of water, flavorings, sweeteners, sweeteners based components, milk, milk based products and combinations thereof.

10. The apparatus of claim 1, further comprising a control panel coupled to and in communication with the controller.

11. The apparatus of claim 1, further comprising a housing for containing the apparatus.

12. A beverage making apparatus comprising:
    a controllable water delivery system for delivering brew water to a brewing substance holder which is removably attachable to the beverage making apparatus;
    the controllable water delivery system including an inlet line, a reservoir, a dispense line and a level sensor;
    a controllable temperature adjusting system for adjusting the temperature of the brew water in the reservoir, the temperature adjusting system comprising at least one temperature sensor and a heater;
    a controller for controllably operating the apparatus, the controller being coupled to the water delivery system and the temperature adjusting system and being programmable with characteristics suitable for predetermined brewing substances;
    the temperature sensor and the heater coupled to and in communication with the controller for controlling the temperature of water in the water delivery system;
    a device reader coupled to and in communication with the controller and associated with the apparatus for detecting and reading an information device on the brewing substance holder, the information device including brewing temperature information for use in setting the brew water temperature of the water delivery system; and
    a control panel coupled to and in communication with the controller.

13. The apparatus of claim 12, wherein the inlet line is coupled to a controllable valve, the controllable valve being couple to and in communication with the controller.

14. The apparatus of claim 12, wherein the dispense line delivers water from the reservoir to a spray head, the dispense line further comprising a controllable valve coupled to and in communication with the controller, wherein water from the spray head flows into the funnel containing brewing substance.

15. The apparatus of claim 12, further comprising a dilution line for delivering dilution water to a server for receiving dilution water and mixing brewed beverages with dilution water, the server suitably positioned to receive water from the dilution line and the holder, the dilution line further comprising a controllable valve coupled to and in communication with the controller for controllably delivering dilution water through the dilution line.

* * * * *